(12) United States Patent
Wang et al.

(10) Patent No.: US 11,740,742 B2
(45) Date of Patent: Aug. 29, 2023

(54) ELECTRONIC DEVICES WITH FINGER SENSORS

(71) Applicant: Apple Inc., Cupertino, CA (US)

(72) Inventors: Forrest C. Wang, Petaluma, CA (US); Ritu Shah, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/919,007

(22) Filed: Jul. 1, 2020

(65) Prior Publication Data

US 2021/0089150 A1 Mar. 25, 2021

Related U.S. Application Data

(60) Provisional application No. 62/904,562, filed on Sep. 23, 2019.

(51) Int. Cl.
*G06F 3/044* (2006.01)
*G06F 3/01* (2006.01)
*G06F 3/041* (2006.01)
*G06F 1/16* (2006.01)
*G02B 27/01* (2006.01)
*G02B 27/00* (2006.01)
*G06F 3/042* (2006.01)
*G06F 3/045* (2006.01)

(52) U.S. Cl.
CPC .............. *G06F 3/044* (2013.01); *G06F 3/011* (2013.01); *G06F 2203/04105* (2013.01)

(58) Field of Classification Search
USPC ........................................................ 345/174
See application file for complete search history.

(56) References Cited

U.S. PATENT DOCUMENTS

| 8,665,177 | B2 | 3/2014 | Herrmann et al. |
| 8,941,560 | B2 | 1/2015 | Wong et al. |
| 9,046,999 | B1 | 6/2015 | Teller et al. |
| 9,223,451 | B1 | 12/2015 | Raffle et al. |
| 9,285,592 | B2 | 3/2016 | Olsson et al. |

(Continued)

OTHER PUBLICATIONS

Gugenheimer et al., FaceDisplay: Towards Asymmetric Multi-User Interaction for Nomadic Virtual Reality, CHI '18, Apr. 21-26, 2018, Montreal, QC, Canada.

(Continued)

*Primary Examiner* — Chineyere D Wills-Burns
(74) *Attorney, Agent, or Firm* — Treyz Law Group, P.C.; G. Victor Treyz; Kendall P. Woodruff

(57) ABSTRACT

An electronic device such as a head mounted device may have an inner display that displays an image for a user through lenses. Head-mounted support structures may be used to support the display and lenses. One or more external displays may be publically viewable while the head-mounted device is being worn. The head-mounted support structures may have a front face on which an external display is mounted. One or more finger sensors that are configured to detect touch input, force input, and/or other input from an external object such as a user's finger may be included in the head-mounted device. A finger sensor may have an elongated shape that runs along a peripheral edge of an external display on the front face. Finger sensors may also be located on other portions of the support structures.

23 Claims, 9 Drawing Sheets

(56) References Cited

U.S. PATENT DOCUMENTS

| | | | |
|---|---|---|---|
| 10,289,205 B1* | 5/2019 | Sumter | G06F 3/017 |
| 2011/0169928 A1 | 7/2011 | Gassel et al. | |
| 2011/0194029 A1* | 8/2011 | Herrmann | H04N 13/398 |
| | | | 348/569 |
| 2013/0069985 A1* | 3/2013 | Wong | G02B 27/0189 |
| | | | 345/633 |
| 2013/0335321 A1* | 12/2013 | Sugita | G06F 3/0488 |
| | | | 345/157 |
| 2015/0002465 A1 | 1/2015 | Tsukahara et al. | |
| 2015/0067580 A1 | 3/2015 | Um et al. | |
| 2015/0253573 A1* | 9/2015 | Sako | H04N 13/398 |
| | | | 345/207 |
| 2016/0041396 A1* | 2/2016 | Kawamura | G02B 27/0172 |
| | | | 345/8 |
| 2016/0216792 A1* | 7/2016 | Ogawa | G06F 3/03547 |
| 2016/0224176 A1* | 8/2016 | Kim | G06F 3/04886 |
| 2017/0068500 A1* | 3/2017 | Rochford | G06F 3/011 |
| 2017/0206688 A1* | 7/2017 | Chun | G06T 11/60 |
| 2017/0230640 A1 | 8/2017 | Rochford et al. | |
| 2018/0004478 A1* | 1/2018 | Chen | A63F 13/212 |
| 2018/0046147 A1* | 2/2018 | Aghara | G02B 27/017 |
| 2018/0096533 A1 | 4/2018 | Osman | |
| 2018/0184974 A1* | 7/2018 | Cimenser | A61B 5/291 |
| 2018/0368559 A1* | 12/2018 | Wang | H04M 1/185 |
| 2018/0373371 A1* | 12/2018 | Kim | G06F 3/011 |
| 2019/0101977 A1* | 4/2019 | Armstrong-Muntner | |
| | | | G06N 20/00 |
| 2019/0129181 A1* | 5/2019 | Polcak | G02B 27/0955 |
| 2020/0310121 A1* | 10/2020 | Choi | G02B 6/34 |
| 2021/0042979 A1* | 2/2021 | Ballagas | G06F 3/013 |

OTHER PUBLICATIONS

Mai et al., TransparentHMD: Revealing the HMD User's Face to Bystanders, MUM 2017, Nov. 26-29, 2017, Stuttgart, Germany.

Pohl et al., See what I see: concepts to improve the social acceptance of HMDs, 2016 IEEE Virtual Reality (VR), Mar. 19-23, 2016, 2 pages, Greenville, SC, USA.

* cited by examiner

ELECTRONIC DEVICES WITH FINGER SENSORS

This application claims the benefit of provisional patent application No. 62/904,562, filed Sep. 23, 2019, which is hereby incorporated by reference herein in its entirety.

BACKGROUND

This relates generally to electronic devices and, more particularly, to electronic devices with input-output components.

Electronic devices sometimes include optical components. For example, a wearable electronic device such as a head-mounted device may include a display for displaying an image. Input devices such as buttons may also be included.

Challenges can arise in providing output and gathering input in a wearable electronic device such as a head-mounted device. If care is not taken, input-output devices may be cumbersome to use and may not be able to provide desired output.

SUMMARY

An electronic device such as a head mounted device may have an inner display that displays an image for a user through lenses. Head-mounted support structures may be used to support the display and lenses. One or more external displays on the head-mounted support structures may be publicly viewable while the head-mounted device is being worn.

The head-mounted support structures may have a front face. One or more finger sensors that are configured to detect touch input, force input, and/or other input from an external object such as a user's finger may be included in the head-mounted device. A finger sensor may have an elongated shape that runs along a peripheral edge of an external display mounted on the front face. Finger sensors may also be located on other portions of a head-mounted support structure.

A finger sensor may have a touch sensor configured to gather touch input from a finger or other external object, a force sensor configured to gather force input from a finger or other external object, a proximity sensor configured to detect fingers that are not touching the finger sensor, and/or other sensing circuitry. A haptic output device in the electronic device may provide haptic feedback (e.g., when a user supplies input to a finger sensor).

A display may overlap the finger sensor. For example, an elongated finger sensor may be overlapped by a corresponding elongated display or other display structure. Icons and other reconfigurable visual elements may be displayed on the elongated display (e.g., to implement a reconfigurable function row for the wearable electronic device). In some configurations, visual elements such as icons can be moved between a first display such as a rectangular main external display and a second display such as an elongated strip-shaped display that runs along a peripheral edge of the main display and that overlaps an elongated strip-shaped finger sensor.

DETAILED DESCRIPTION

Electronic devices such as wearable electronic devices may include displays, speakers, haptic output devices, and other output devices for presenting output to users. These electronic devices may also include sensors for gathering environmental measurements and user input. The sensors may include one or more sensors for gathering user input from a user's fingers or other external objects. These sensors, which may sometimes be referred to herein as finger sensors, may include capacitive touch sensors, optical touch sensors, resistive touch sensors, and/or other sensors for detecting when a finger or other external object has supplied touch input, may include force sensors such as strain gauge sensors and other sensors for detecting applied force, and/or may include other sensors for gathering input such as proximity sensors that detect when a finger or other object is close to the sensor and/or is moving through the air adjacent to a device, but has not touched the device. Single-finger input and multi-finger input may be gathered using a finger sensor.

Figure 1:
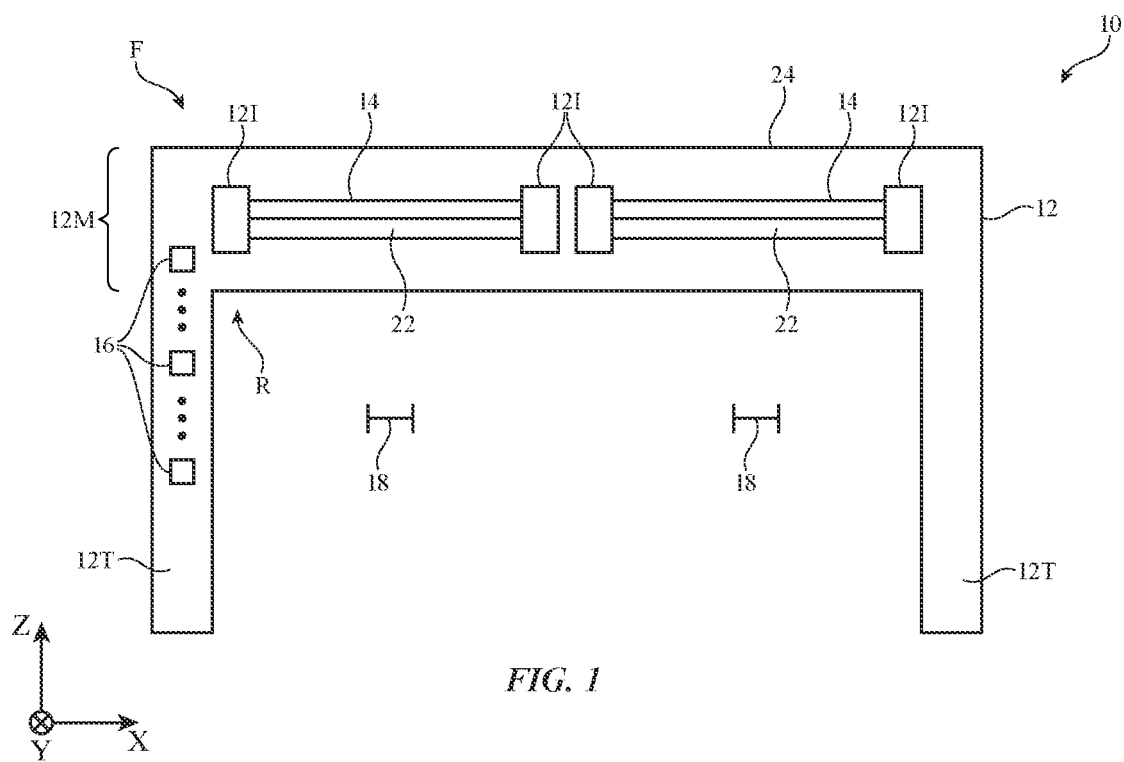
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion (e.g., support structures 12T) to allow device 10 to be worn on a user's head. A main housing portion (e.g., support structure 12M) and associated internal housing portion (e.g., internal support structures 12I) may support the display, lenses, and other optical components (e.g., structures 12I may serve as lens support structures).

Front face F of housing 12 may face outwardly away from a user's head. Rear face R of housing 12 may face the user. During operation, a user's eyes are placed in eye boxes 18. When the user's eyes are located in eye boxes 18, the user may view content being displayed by display 14 through associated lenses 22. Display 14 faces inwardly toward eye boxes 18 and may therefore sometimes be referred to as a rear-facing display, an inner display, an inwardly facing display, a display that is not publicly viewable, or a private display. Front face F of device 10 faces away from eye boxes 18 and faces away from lenses 22.

In some configurations, optical components such as display 14 and lenses 22 are configured to display computer-generated content that is overlaid over real-world images (e.g., a user may view the real world through the optical components). In other configurations, which are sometimes described herein as an example, real-world light is blocked (e.g., by an opaque housing wall at front face F of housing 12 and/or other portions of device 10).

In addition to inwardly facing optical components such as inner display 14 and associated lenses 22 that allow a user with eyes in eye boxes 18 to view images, device 10 may have one or more displays and/or other light-emitting components (e.g., status indicator lights, illuminated button icons, etc.) that are located on exterior surfaces of device 10. Device 10 may, for example, have one or more external displays (sometimes referred to as outwardly facing displays or publicly viewable displays) such as display 24 on front face F. Display 24 may present images that are viewable to people in the vicinity of the user while the user is wearing and while the user is using device 10 to view images on display 14. Display 24 may also be used to display images on the exterior of device 10 that are viewable by the user when device 10 is not being worn (e.g., when device 10 is resting in the user's hand or on a table top and is not on a user's head). Display 24 may be a touch sensitive display and/or may be a force sensitive display (e.g., display 24 or part of display 24 may overlap a finger sensor) or, if desired, display 24 may be insensitive to touch and force input. There may be one or more outwardly facing displays such as display 24 in device 10. Haptic output components may be overlapped by one or more of these outwardly facing displays or may be mounted elsewhere in housing 12 (e.g., to provide haptic output when a user supplies finger input such as touch input and/or force input to a portion of a display).

The support structures of device 10 may include adjustable components. For example, support structures 12T and 12M of housing 12 may include adjustable straps or other structures that may be adjusted to accommodate different head sizes. Support structures 12I may include motor-driven adjustable lens mounts, manually adjustable lens mounts, and other adjustable optical component support structures. Structures 12I may be adjusted by a user to adjust the locations of eye boxes 18 to accommodate different user interpupillary distances. For example, in a first configuration, structures 12I may place lenses and other optical components associated respectively with the user's left and right eyes in close proximity to each other so that eye boxes 18 are separated from each other by a first distance and, in a second configuration, structures 12I may be adjusted to place the lenses and other optical components associated with eye boxes 18 in a position in which eye boxes are separated from each other by a second distance that is larger than this distance.

In addition to optical components such as displays 14 and 24, device 10 may contain other electrical components 16. The electrical components of device 10 such as the displays and other electrical components 16 may include integrated circuits, discrete components, printed circuits, and other electrical circuitry. For example, these components may include control circuitry and input-output devices.

The control circuitry of device 10 may include storage and processing circuitry for controlling the operation of device 10. The control circuitry may include storage such as hard disk drive storage, nonvolatile memory (e.g., electrically-programmable-read-only memory configured to form a solid-state drive), volatile memory (e.g., static or dynamic random-access-memory), etc. Processing circuitry in the control circuitry may be based on one or more microprocessors, microcontrollers, digital signal processors, baseband processors, power management units, audio chips, graphics processing units, application specific integrated circuits, and other integrated circuits. Software code may be stored on storage in the control circuitry and run on processing circuitry in the control circuitry to implement control operations for device 10 (e.g., data gathering operations, operations involving the adjustment of the components of device 10 using control signals, etc.). Control circuitry in device 10 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Output components in the input-output devices may allow device 10 to provide a user with output and may be used to communicate with external electrical equipment.

The input-output devices of device 10 may include one or more displays such as inner display 14 and external display 24. External display 24 may be formed from a liquid crystal display, organic light-emitting diode display, a display with an array of crystalline semiconductor light-emitting diode dies, or a display based on other types of pixels. In some configurations, a display in device 10 may include left and right display devices (e.g., display 14 may be formed from left and right components such as left and right scanning mirror display devices, liquid-crystal-on-silicon display devices, digital mirror devices, or other reflective display devices, left and right display panels based on light-emitting diode pixel arrays such as organic light-emitting display panels or display devices based on pixel arrays formed from crystalline semiconductor light-emitting diode dies, liquid crystal display devices panels, and/or or other left and right display devices in alignment with the user's left and right eyes, respectively). In other configurations, display 14 may include a single display panel that extends across both eyes or uses other arrangements in which content is provided with a single pixel array.

The display(s) of device 10 may be used to display visual content for a user of device 10. The content that is presented on display 14 may, for example, include virtual objects and other content that is provided to the display by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source such as an infrared light source that emits one or more beams of light that are tracked using the image sensor after reflecting from a user's eyes), touch sensors, buttons, capacitive proximity sensors, light-based (optical) proximity sensors, other proximity sensors, force sensors such as strain gauges, capacitive force sensors, resistive force sensors and/or other force sensors configured to measure force input from a user's fingers or other external objects on a display, track pad, or other input surface, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors (e.g., two-dimensional capacitive fingerprint sensors, two-dimensional optical fingerprint sensors, etc.), and/or other sensors.

User input and other information may be gathered using sensors and other input devices in the input-output devices of device 10. If desired, device 10 may include haptic output devices (e.g., vibrating components overlapped by a display, portions of a housing wall, and/or other device structures), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., the portion of housing 12 formed by support structures 12T and the portion of housing 12 formed from support structures 12M and 12I). In configurations in which electronic device 10 is a head-mounted device (e.g., a pair of glasses, goggles, a helmet, a hat, etc.), structures 12T and 12M and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

Figure 2:
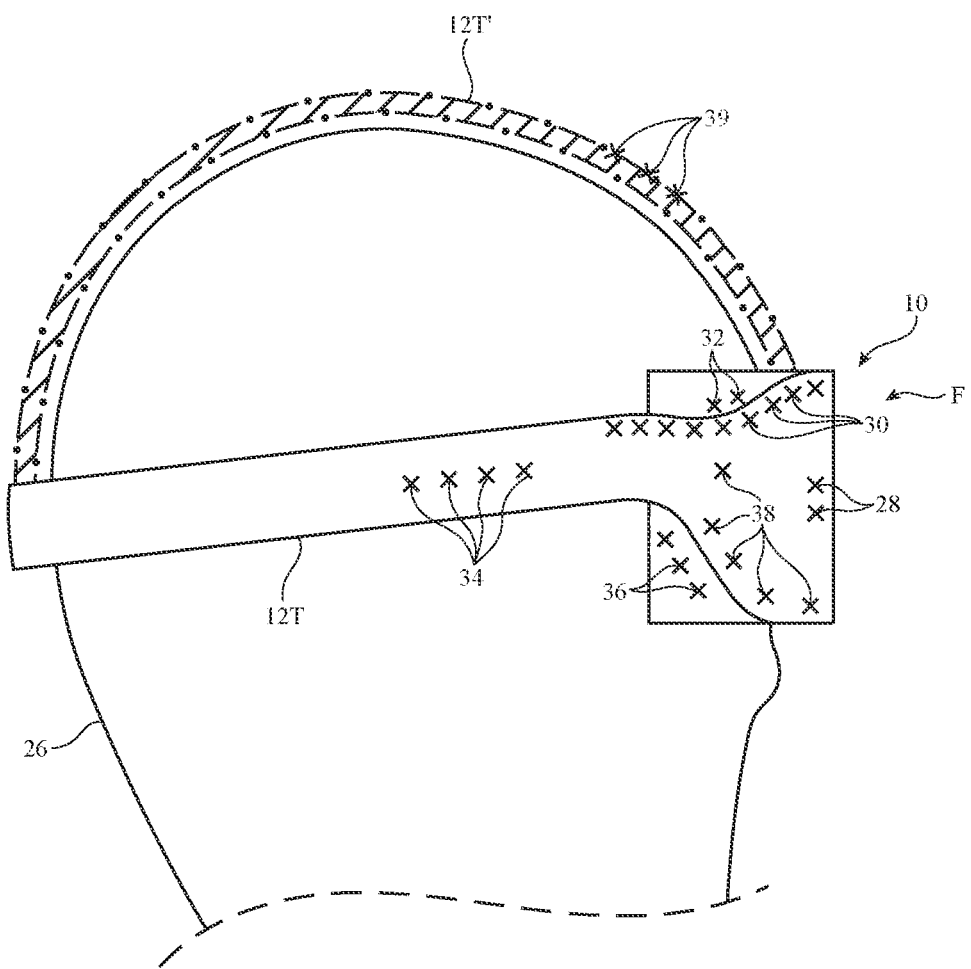
FIG. 2 is a side view of an illustrative electronic device with input-output components in accordance with an embodiment.

FIG. 2 is a side view of device 10 in an illustrative configuration in which device 10 is a head-mounted device with support structures that allow device 10 to be worn on head 26 of a user. The support structures of device 10 may include, for example, structures 12T (e.g., a strap such as a horizontally extending head band) and/or structures 12T' (e.g., a strap such as a top-of-head headband that extends from front to back along the middle of the user's head). The housing of device 10 and optional structures such as display 24 may include structures on front face F of device 10. The support structures forming the body of device 10 may include planar surfaces and/or curved surfaces such as curved surfaces that create smooth transitions between front-facing surfaces of device 10 and sideways facing surfaces of device 10 (e.g., devices along the user's ears and/or other portions of the side of head 26).

Finger sensors with or without haptic output devices (e.g., sensors such as touch sensors, force sensors, proximity sensors for detecting finger presence and/or finger air gestures), may be located at any suitable location on device 10 such as a locations 34 extending along some or all of a horizontally extending head strap (structure 12T), at locations 39 extending along some or all of the surface of a top-of-head strap such as structure 12T, at locations 32 along an upwardly facing surface on the upper portion of the main housing of device 10 (e.g., along an upper peripheral edge of the main housing of device 10), at locations 36 on the opposing lower (downwardly facing) surface along the periphery of the main housing of device 10, at locations 38 on portions of the front of device 10 that face partially forward and partially sideways from head 26, at locations 28 in the center of front face F, and/or at locations 30 at peripheral edge portions on front face F (and, if desired, at associated peripheral edge portions of support 12T that extend continuously rearward from front face F). These are illustrative locations for forming finger sensors and/or other sensors in components 16. The use of locations such as these in adjusting the operation of device 10 are sometimes described as examples. Other locations in device 10 (e.g., any exposed surfaces of device 10 and the support structures forming device 10) may be provided with sensors such as finger sensors, if desired.

Figure 3:
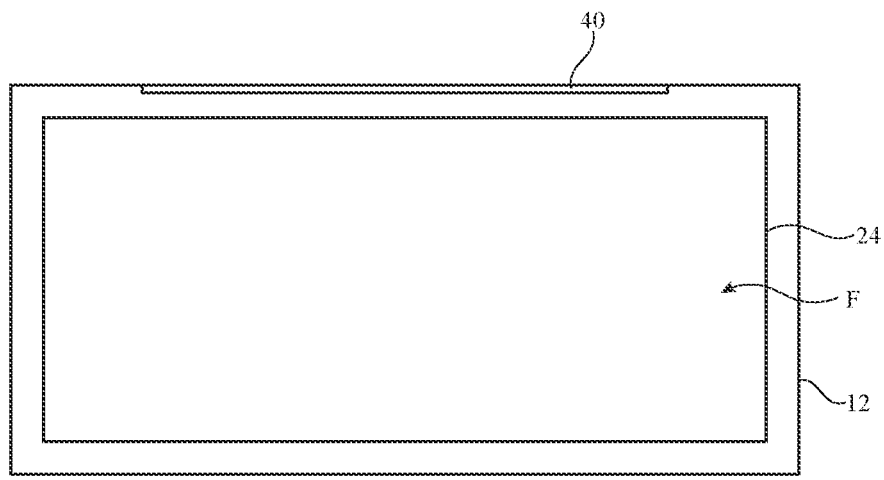
FIG. 3 is a front view of an illustrative electronic device with an area for a front-facing display and an elongated sensor such as a peripheral finger sensor strip in accordance with an embodiment.

FIG. 3 is a front view of device 10 in an illustrative configuration in which front facing display 24 has been formed over most of front face F of housing 12. Sensors such as finger sensors may be formed along one or more portions of the peripheral edge of housing 12 on front face F. As shown in FIG. 3, for example, sensor 40 (e.g., a finger sensor) may be formed in an elongated shape such as strip (e.g., a bar) running horizontally across the upper peripheral edge of housing 12. In the example of FIG. 3, sensor 40 extends partly across the majority of the width of device 10. In other configurations, sensor 40 may extend across more or less of the width of device 10 and/or may be located along the left and/or right peripheral edges of housing 12 and display 24 and/or the lower peripheral edge of housing 12.

Sensor 40 may, if desired, be separate from display 24. If, as an example, display 24 is not touch sensitive, sensor 40 may be used to gather finger input while optionally using display 24 to provide visual output that changes in response to the gathered finger input. In arrangements in which display 24 is touch sensitive, a user may use sensor 40 and display 24 to provide finger input. For example, a user may select on-screen options on display 24 by touching the on-screen options as they are displayed on display 24 and a user may adjust an operating parameter of device 10 by moving a finger along the length of sensor 40 (as an example).

Figure 4:
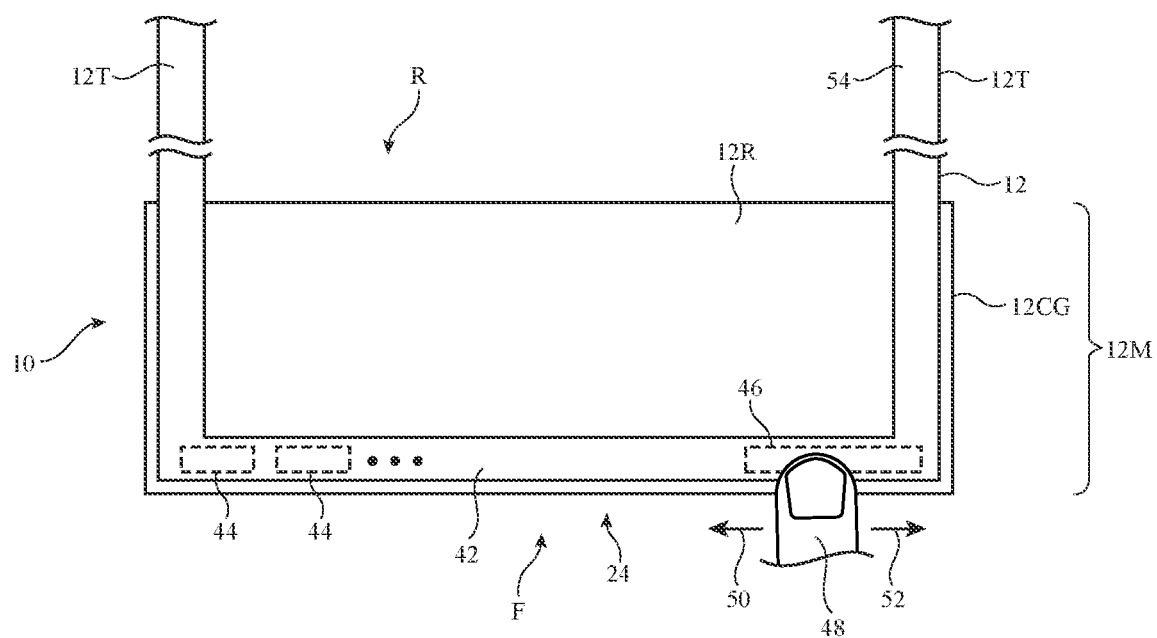
FIG. 4 is atop view of an illustrative electronic device such as a with a finger sensor in accordance with an embodiment.

FIG. 4 is a top view of device 10 showing how sensors such as finger sensors (e.g., sensor 42 of FIG. 4) may be formed along the upper rim of housing 12. The upper rim of housing 12 may be characterized by a upper housing surface that is not parallel to front face F. In this location, sensor 42 extends along the upper peripheral border of front facing display 24 on front face F. The surface of sensor 42 may face upward when device 10 is being worn on the user's head (e.g., sensor 42 may be characterized by a surface normal that is perpendicular or nearly perpendicular to the surface normal of front-facing display 24). If desired, sensor 42 and/or other finger sensors in device 10 may have an associated display (e.g., an organic light-emitting display or other display that covers the same area on device 10 as the sensor). The display may include touch sensor components (e.g., a one-dimensional or two-dimensional capacitive touch sensor, an optical touch sensor, etc.), one or more force sensor components (e.g., a force sensor that detects force input in a downward direction that is into the page in the example of FIG. 4), or other sensor components.

The control circuitry of device 10 can provide interactive visual elements such as selectable on-screen options on an external display such as the display overlapping sensor 42. For example, selectable icons 44 may be adjusted in real time by the control circuitry and the control circuitry can take corresponding action in response to user finger input selecting a given one of icons 44. As an example, a display associated with sensor 42 may display icons 44 and one or more of the displayed icons 44 may correspond to a selectable option. Finger input may be supplied to sensor 42 during operation. When finger input on an icon corresponding to a selectable option is received, the control circuitry of device 10 may adjust the operating of device 10 to place device 10 into a given operating mode associated with the selectable option. If desired, sensor 42 and/or the other fingerprint sensors of device 10 may be a fingerprint sensor or may include a fingerprint sensor. In this type of configuration, each of a user's different fingerprints (or different fingerprints from different corresponding users) may be used to trigger execution by device 10 of a different corresponding task. For example, in response to receiving finger input from a first finger, device 10 may enter a first mode of operation, whereas in response to receiving finger input from a second finger that is different than the first finger, device 10 may enter a second mode of operation that is different than the first mode of operation. Fingerprints may be used for authentication, for launching specific applications, operating system functions, or other software, and/or for otherwise providing device 10 with user input.

Haptic feedback (e.g., a pulsed vibration) may optionally be provided when an option is selected to help confirm to the user that input has been received by sensor 42. If desired, selectable on-screen options may include reconfigurable (or fixed) sliding input buttons (see, e.g., illustrative slider button 46). A user may use this button (e.g., a touch screen slider button with a movable indicator that represents the current state of the slider button) to provide input for changing an analog value (e.g., playback volume, display brightness, etc.). For example, a user may place finger 48 on slider button 46 and may move finger 48 in direction 50 to increase audio volume or to increase display brightness and in direction 52 to decrease audio volume or to decrease display brightness (as examples). Configurations in which sensor 42 of FIG. 4 gathers input from the user without using a corresponding display and/or without using an associated haptic output devices may also be used.

In some arrangements, display 24 may be covered with a protective cover layer such as display cover layer 12CG of main housing portion 12M. Layer 12CG may have a curved shape (e.g., a shape that wraps around the front of the user's face) and may be formed from clear polymer, glass, or other transparent materials. The pixels of display 24 may be overlapped by layer 12CG, so that a user may view images on front face F through layer 12CG. Display 24 in this type of arrangement may be a flexible display that is curved to conform the curved inner surface of layer 12CG. Housing structure 12R may have portions that form an upwardly facing surface for supporting sensor 42 and may be configured to wrap around a user's facial features (e.g., structure 12R may have a recess to accommodate a user's nose). Housing structure 12R may have soft portions (e.g., foam, fabric, etc.) for forming a cushioning structure adjacent to a user's face. In general, housing 12 may be formed from any suitable materials (e.g., glass, ceramic, metal, polymer, fiber-composites such as fiberglass and carbon fiber material, fabric, wood and other natural materials, and/or other materials).

Figure 5:
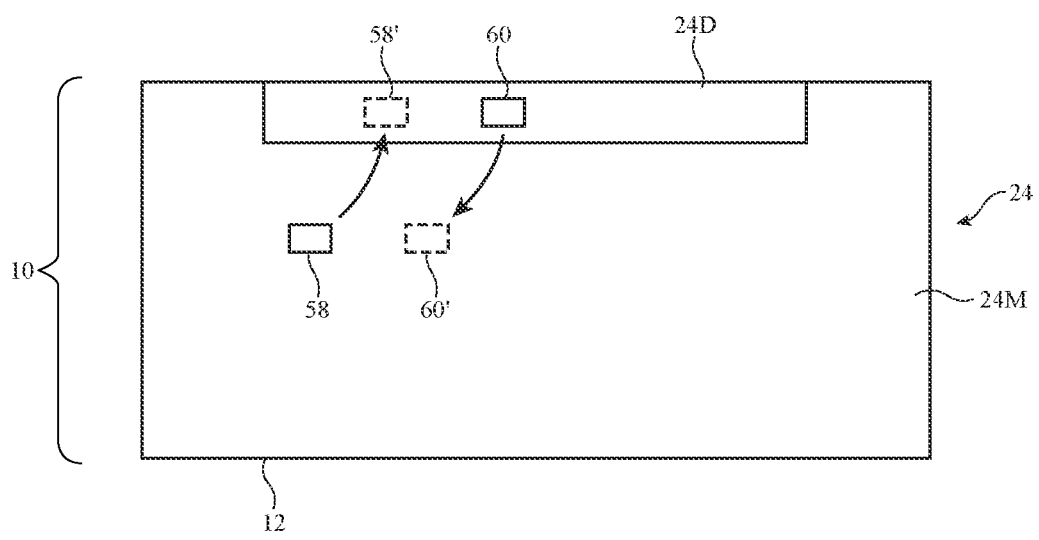
FIGS. 5 and 6 are front views of illustrative electronic devices with displays in accordance with embodiments.

In the example of FIG. 5, display 24 has a first front-facing portion such as main front-facing display 24M and a second portion (formed from the same display substrate and/or a separate display substrate) forming an elongated strip-shaped display 24D. Display 24 (e.g., display 24M and/or display 24D) may be provided with finger sensors and, if desired, optional haptic output. For example, elongated strip-shaped display 24D may overlap an identically sized or similarly sized elongated strip-shaped finger sensor. Display 24M may overlap a two-dimensional touch sensor or other two-dimensional finger sensor. In some configurations, display 24 may overlap a two-dimensional finger sensor. A haptic output device may supply feedback in response to gathered finger input. Arrangements in which a portion of display 24 does not overlap any finger sensor components may also be used.

As shown in FIG. 5, in arrangements in which display 24 senses finger input a user may provide touch input or other finger input to drag and drop visual elements on display 24 (e.g., icons corresponding to applications or other software on device 10). For example, a user may drag and drop an icon from display 24M such as icon 58 to a location on display 24D such as location 58' and the user may drag and drop an icon from display 24D such as icon 60 to a location on display 24M such as location 60'. Strip-shaped display 24D may function as a dynamic function row that contains customized function buttons (e.g., user-selected and/or default icons corresponding to applications, operating system functions, or other device functions).

Figure 6:
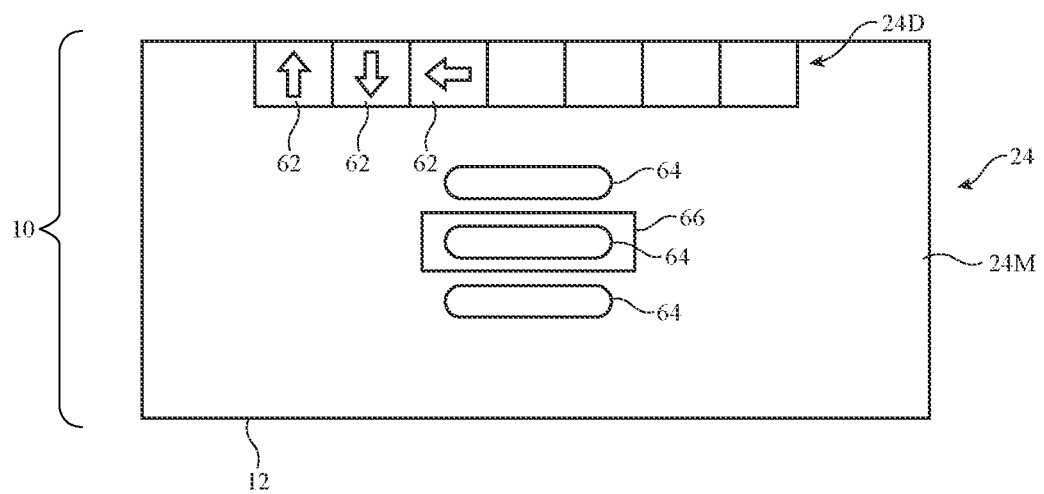

In the example of FIG. 6, display 24D contains multiple user-selectable options 62. Display 24D of FIG. 6 may overlap a finger sensor (e.g., a sensor for gathering touch input, force input, and/or other finger input) and may optionally overlap a haptic output device. A user may supply finger input to select a given one of options 62. Options 62 may correspond to navigation functions that move and select a highlight such as highlight 66 between various on-screen options 64. Using this type of input arrangement, a user may move highlight 66 onto an on-screen option of interest and can then select one of options 62 to select the highlighted option (e.g., one of options 62 can serve as an "select" key). Display 24D may display reconfigurable button labels (e.g., icons) and/or fixed button labels in device 10 may be placed over different finger sensors and/or portions of finger sensors. In the example of FIG. 6, display 24D (and its associated finger sensor) have elongated strip shapes and run along the upper peripheral edge of display 24M and housing 12 for device 10. This allows a user to provide finger input without obscuring visual content on display 24M (e.g., without visually blocking on-screen options 64 from view). The use of a finger sensor that runs along the edge of display 24 (e.g., a finger sensor overlapped by display 24D of FIG. 6) may help a user provide device 10 with finger input (e.g., in a configuration in which display 24M is a touch-insensitive display that does not overlap any finger sensor devices). Arrangements in which display 24 overlaps one or more finger sensors (and, if desired, haptic output devices) may also be used, if desired. Display 24D (and its associated finger sensor) may face outwardly (e.g., display 24D may have a surface normal parallel to the surface normal of display 24M and/or display 24D may face upwardly while display 24M faces horizontally outwardly). Configurations in which display 24D and its associated finger sensor runs vertically along a right or left peripheral edge of housing 12 may also be used.

Figure 7:
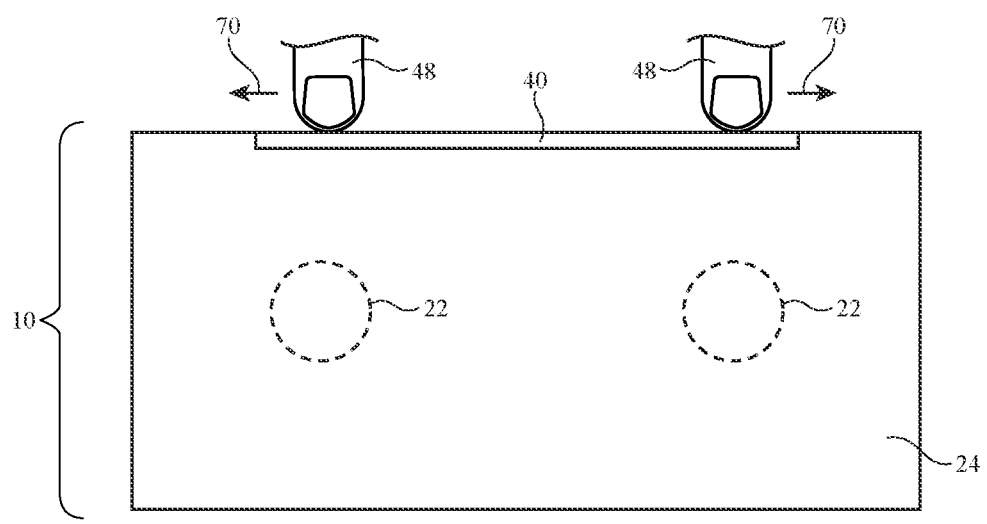
FIG. 7 is a front view of an illustrative head-mounted device with a finger sensor for adjusting device settings such as lens position settings in accordance with an embodiment.

FIG. 7 is a front view of device 10 in an illustrative configuration in which a finger sensor is being used to adjust the distance between lenses 22 (e.g., to accommodate a user's interpupillary distance). A finger sensor such as finger sensor 40 may run along an upper peripheral edge of display 24 and the housing of device 10. In this location, a user may place fingers 48 on left and right portions of finger sensor 40. To increase the spacing between lenses 22, the user may move fingers 48 away from each other (e.g., by sliding fingers 48 away from each other along the surface of finger sensor 40 in directions 70 as shown in FIG. 7). The current horizontal location of each finger 48 may correspond to an associated current location for a respective one of lenses 22. The distance between lenses 22 (e.g., the center-to-center spacing of lenses 22) may be decreased by moving fingers 48 towards each other. Lenses 22 may be positioned using electromagnetic actuators (e.g., motors, etc.) or other lens positioners in response to finger input. Because the user's fingers are located near to lenses 22 and because the user's fingers move in the directions in which the user desires to move lenses 22, this type of approach for making lens spacing adjustments may be intuitive for a user.

In general, any suitable computer-controlled actuators may be controlled by supplying input to device 10 (e.g., using one or more finger sensors). For example, actuators may be used to tighten and/or loosen headbands, to adjust a cushion resting between housing 12 and the front of the user's face (e.g., to adjust the spacing between the user's eyes and display 14), and/or to adjust other mechanical attributes of device 10. Moreover, a user may use finger input on peripheral finger sensors and/or other finger sensors to adjust other device operating parameters. For example, a user may move a finger back and forth across a horizontally extending elongated finger sensor on the top edge of front face F in order to adjust stereo balance (left-versus-right audio playback volume associated with left and right speakers mounted on support structures 12T on the left and right of the user's head, respectively or left and right speakers in an associated headset or set of wireless ear buds), and/or may otherwise use a slider input device implemented using an elongated finger sensor in housing 12 to adjust audio playback settings and/or other device operating settings. In some configurations, device 10 may be used as a remote control device (e.g., so that finger input may be used to adjust stereo balance in an external audio system in addition to or instead of adjusting stereo balance in device 10).

Figure 8:
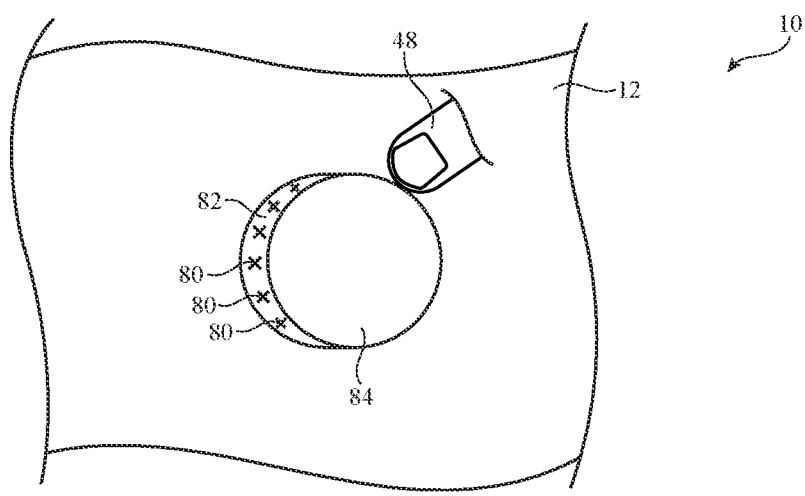
FIG. 8 is a perspective view of an illustrative finger sensor formed on a protruding support structure in accordance with an embodiment.

FIG. 8 is a perspective view of an exterior portion of housing 12. Finger sensor 80 has been formed on a protruding portion of housing 12 (e.g., on ring-shaped sidewall surface 82 on protruding support structure 84). Protruding support structure 84 may have a circular outline, an outline with curved and/or straight edges, and/or other suitable shape. Finger sensor 80 may gather finger input from one or more fingers 48 or other external objects. A user may, for example, slide a single finger 48 along the curved peripheral edge of protruding support structure 84 to adjust audio volume, screen brightness, or other adjustable operating parameters. If desired, a user may place two (or more) fingers 48 on the periphery of protruding portion 84 while supplying the finger sensor with input. In this way a user may, for example, supply finger sensor 80 with finger input that emulates the twisting of a rotatable knob (even when protrusion support structure 84 is fixed and is not rotating while the user twists their fingers).

If desired, a finger sensor may run around the border of front face F of housing 12. In the illustrative configuration of FIG. 9, a visual element such as icon 88 is being presented to the user. Icon 88 may be displayed on inwardly-facing display 14 (e.g., in a peripheral region of the user's field of view) and/or on outwardly-facing display 24. Device 10 may have a finger sensor such as finger sensor 86 that runs along the peripheral edge of housing 12 and display 24 (e.g., some or all of the ring-shaped border of display 24). Sensor 86 may be, for example, a capacitive touch sensor, optical touch sensor, or other touch sensitive sensing circuitry. When a user desires to move icon 88 along the periphery of the user's field of view (e.g., as icon 88 is being displayed on display 14), the user may place finger 48 on finger sensor 86 and can drag and drop icon 88 along the edge of the user's field of view to a new desired location such as location 88'. In this way, a user may directly move notification icons and other visual elements on display 14 to desired peripheral display locations (e.g., to customize where these icons are displayed along the edge of the user's field of view). During operation of device 10, content that the user is viewing (e.g., moving images) may be displayed in the central main portion of display 14 while user-customized visual elements (e.g., icons corresponding to regions for incoming messages, information on the current times, calendar entries, and/or other information) can be displayed at desired user-selected locations.

Figure 9:
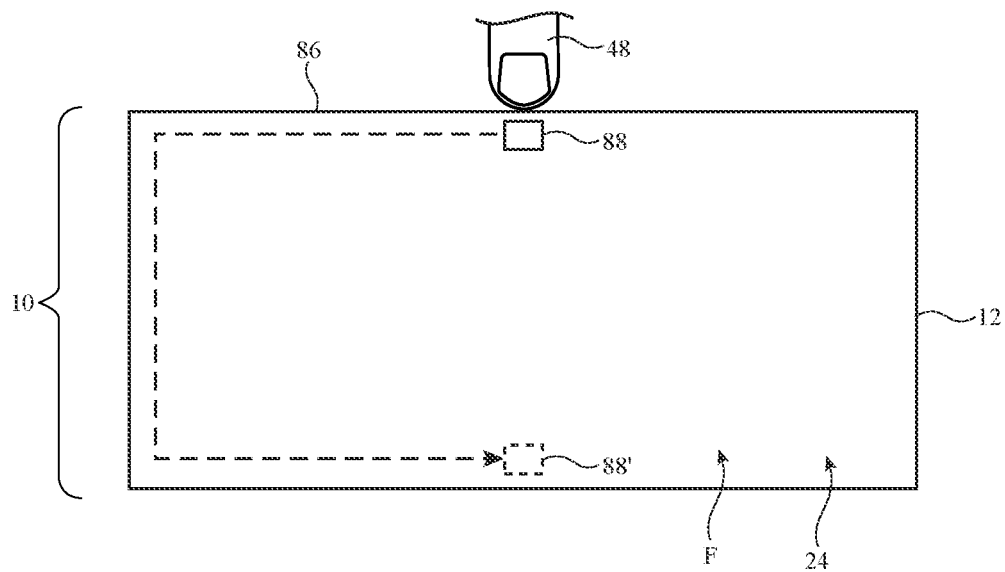
FIG. 9 is a front view of an illustrative head-mounted device with a peripheral finger sensor in accordance with an embodiment.

The illustrative example of FIG. 9 involves use of a ring-shaped finger sensor (finger sensor 86) that runs along some or all of the periphery of front face F of device 10 to move visual elements (icons, etc.) that device 10 is displaying for the user on display 14 (or display 24). If desired, a finger sensor may be located on other portions of housing 12, as described in connection with FIG. 2. As an example, a user may use the finger sensor at locations 30 to move a visual element that is being displayed on the peripheral left side of the user's field of view to the peripheral right side of the user's field of view, etc. In general, any of the finger sensor locations described in connection with device 10 (e.g., any of the finger sensor locations of FIG. 2, etc.) can be used as adjustable slider buttons, to display customizable interactive buttons (selectable icons), can be used to drag and drop or otherwise manipulate content appearing on external displays such as display 24, can be used to move visual elements from one portion of display 14 to another, etc.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to control the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR, environment may be made in response to representations of physical motions (e.g., vocal commands), a person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback, smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, microLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
an inner display;

a lens through which the inner display is visible from an eye box;

a head-mounted support structure configured to support the inner display and lens, wherein the head-mounted support structure has a front face that faces away from the lens and an opposing rear face that faces the eye box;

a finger sensor that runs along a peripheral edge of the front face of the head-mounted support structure, wherein a portion of the head-mounted support structure separates the finger sensor from the inner display; and control circuitry configured to adjust a visual element being displayed by the inner display based on finger input gathered by the finger sensor.

2. The head-mounted device defined in claim 1 wherein the finger sensor comprises an elongated strip-shaped touch sensor, the head-mounted device further comprising:

a first external display on the front face; and a second external display that is separate from the first external display, wherein the second external display is supported by the head-mounted support structure and overlaps the elongated strip-shaped touch sensor.

3. The head-mounted device defined in claim 1 wherein the finger sensor comprises a force sensor.

4. The head-mounted device defined in claim 1 wherein the finger sensor has an elongated shape and extends at least partly across an upper edge of the front face of the head-mounted support structure.

5. The head-mounted device defined in claim 1 further comprising a publicly viewable display on the front face.

6. The head-mounted device defined in claim 1 further comprising:

a publicly viewable touch insensitive display on the front face having a top edge, wherein the finger sensor runs along the top edge.

7. The head-mounted device defined in claim 1 wherein the head-mounted support structure has a main portion that is configured to support the inner display, wherein the head-mounted support structure has a head strap portion, and wherein at least some of the finger sensor is on the head strap portion.

8. The head-mounted device defined in claim 1 wherein the head-mounted support structure has a top-of-head headband and wherein the finger sensor is formed on the top-of-head headband.

9. The head-mounted device defined in claim 1 further comprising an elongated strip-shaped display running along the peripheral edge of the front face, wherein the finger sensor overlaps the elongated strip-shaped display.

10. The head-mounted device defined in claim 1 wherein the finger sensor comprises an elongated strip-shaped touch sensor.

11. The head-mounted device defined in claim 1 wherein the finger sensor comprises a touch sensor.

12. The head-mounted device defined in claim 1 further comprising a first publicly viewable display on the front face overlapping the finger sensor and a second publicly viewable display on the front face that is separate from the first publicly viewable display, wherein the control circuitry is configured to move an icon from the second publicly viewable display to the first publicly viewable display.

13. The head-mounted device defined in claim 1 further comprising a first publicly viewable display on the front face overlapping the finger sensor and a second publicly viewable display on the front face that is insensitive to touch.

14. The head-mounted device defined in claim 1 further comprising an actuator coupled to the lens, wherein the control circuitry is configured to move the lens with the actuator to adjust a lens-center-to-lens-center spacing in response to finger input received with the finger sensor.

15. The head-mounted device defined in claim 1 further comprising a haptic output device, wherein the control circuitry is configured to use the haptic output device to provide haptic output in response to finger input from the finger sensor.

16. A head-mounted device, comprising:

an inner display;

a lens through which the inner display is visible from an eye box;

a head-mounted support structure configured to support the inner display and the lens, wherein the head-mounted support structure has a front face that faces away from the lens and an opposing rear face that faces the eye box;

an external display on the front face that is configured to be publicly viewed while the inner display is being viewed through the lens, wherein the external display has a peripheral edge; and a finger sensor that runs along the peripheral edge of the external display and that is not overlapped by the external display.

17. The head-mounted device defined in claim 16 wherein the finger sensor comprises an elongated strip-shaped sensor that is on an upper peripheral edge of the external display.

18. The head-mounted device defined in claim 17 wherein the external display is touch insensitive, the head-mounted device further comprising a strip-shaped display overlapping the elongated strip-shaped sensor.

19. A head-mounted device, comprising:

an inner display;

a lens through which the inner display is visible from an eye box;

a head-mounted support structure configured to support the inner display and the lens, wherein the head-mounted support structure has a front face that faces away from the lens, an opposing rear face that faces the lens, and an upper surface that is not parallel to the front face;

an external display on the front face that is configured to be publicly viewed while the inner display is being viewed through the lens; and a sensor on the upper surface that is configured to gather finger input, wherein a portion of the head-mounted support structure separates the sensor on the upper surface from the external display on the front face.

20. The head-mounted device defined in claim 19 wherein the sensor comprises a fingerprint sensor.

21. The head-mounted device defined in claim 19 wherein the sensor comprises an elongated capacitive touch sensor that overlaps an additional external display that is separate from the external display.

22. A head-mounted device, comprising:

an inner display;

a lens through which the inner display is visible from an eye box;

a head-mounted support structure configured to support the inner display and the lens;

an external display that overlaps the inner display;

a sensor located between the inner display and the external display, wherein the sensor is configured to gather finger input; and control circuitry configured to adjust a position of the lens in response to the finger input.

23. A head-mounted device, comprising:
an inner display;
a lens through which the inner display is visible from an eye box;
a head-mounted support structure configured to support the inner display and the lens;
an external display that overlaps the inner display; and
a touch sensor on the head-mounted support structure that is separate from the external display.

* * * * *